Feb. 5, 1963 W. M. BOOTH 3,076,581
MEASURING DISPENSER FOR LIQUIDS
Filed June 22, 1959 2 Sheets-Sheet 1

INVENTOR
WILLIAM M. BOOTH

BY

ATTORNEYS

Feb. 5, 1963 W. M. BOOTH 3,076,581
MEASURING DISPENSER FOR LIQUIDS
Filed June 22, 1959 2 Sheets-Sheet 2

INVENTOR
WILLIAM M. BOOTH

BY *Price and Heneveld*

ATTORNEYS

United States Patent Office 3,076,581
Patented Feb. 5, 1963

3,076,581
MEASURING DISPENSER FOR LIQUIDS
William M. Booth, 439 Ohio St., Grand Haven, Mich.
Filed June 22, 1959, Ser. No. 822,109
2 Claims. (Cl. 222—453)

This invention relates to a device for dispensing liquid or granular material from a container and more particularly to measuring the amount of liquid or granular material dispensed therefrom.

It is a well accepted fact that the great majority of liquid products sold on the market today are packaged in containers possessing a plastic spout with a plastic cap threaded thereon to seal the container. This is particularly true of saponizers such as the detergents sold in liquid form. It is common practice for the housewife to use the container cap as an instrument of measure. For example, if she wants to do the dishes, she unscrews the cap from the spout of the container and pours the amount of detergent she considers necessary to do the job into the cap. She then empties the liquid in the cap into the dish water and replaces the cap on the container spout.

Such a method is time consuming because the cap must be removed, the liquid measured, poured out the cap, and the cap replaced on the container spout. Such an arrangement is also messy in that it is hard to judge when the cap is full of liquid and the liquid sometimes spills over onto the user's hands. It can readily be seen that such a method of measuring can also be wasteful since the spilled liquid may not be necessary to do the job at hand.

Further, after a period of use, the cap becomes coated with a gummy film of the detergent, making it hard to handle and difficult to thread on and off the spout.

It is one object of this invention to eliminate these many undesirable features of the present method of measuring and dispensing.

Another object of this invention is to measure liquids or granular materials automatically as the container is tipped into a pouring position.

Still another object of this invention is to disclose a means whereby a dispensing and measuring device may be used with containers presently on the market.

A further object of this invention is to disclose a measuring and dispensing device which can be removed from an empty container and reused in a new full container for the same purpose.

Still another object of this invention is to disclose a means whereby the dispensing and measuring device may be by-passed and the fluid or granular material allowed to pour freely.

Another object of this invention is to disclose a dispensing and measuring device which can be molded as a one piece unit.

This measuring and dispensing device has other advantages one of which is that it is very inexpensive to manufacture. Therefore, if the user desires, it can be thrown away with the container with no real monetary loss to the user.

Another advantage of the device is that it contains a closure head which will operate as a seal and prevent air from entering the container. Therefore, if the cap of the container should become misplaced or lost, the container is sealed by the closing head.

All of the aforementioned advantages are present in the dispensing and measuring device here proposed as well as other advantages which will become more apparent from the description of such dispensing and measuring device which follows.

Figure 1:
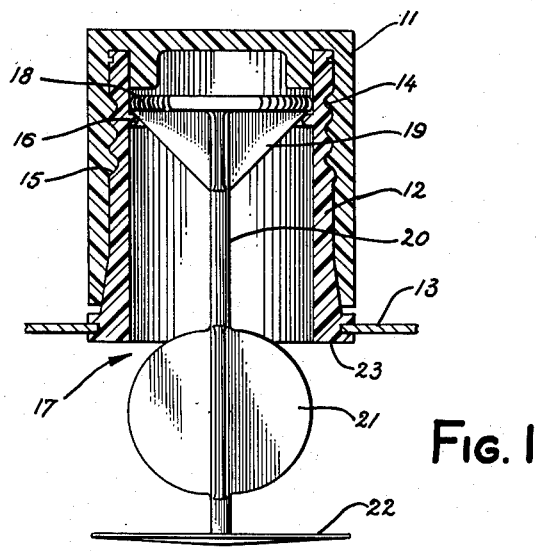
FIG. 1 is a side elevational view of the measuring and dispensing device in its normal position when disposed in a container, and the container is upright.

Referring to the drawings in greater detail, FIG. 1 shows a fragment of a container 13 to which is attached a pouring spout or tubular housing 12. The pouring spout 12 has threads 14 adapted to engage the threads 15 of the cap 11. The cap 11 is of conventional design and provides a means for sealing the liquid in the container in the customary manner.

The pouring spout 12 is provided with a ring 16 which acts as a seat or support for the closure head 18 of the dispensing and measuring device designated generally as a pendulum 17. The member 17 of the device is considered to be a pendulum for reasons that will be described more fully hereinafter. The closure head 18 of the pendulum 17 is connected to a shank 20. Secured to the shank 20 and the base of the closure head 18, at equally spaced intervals of 90°, are guide webs 19. These flare outwardly from the shank 20 at a sharp angle, giving the underside of the closure head 18 a somewhat conical effect. The guide webs assure that the closure head 18 returns to its sealing position (FIG. 1) when the container is rotated from its pouring position to its upright position.

Also secured to the shank 20 of the pendulum 17, at 90° intervals thereabout, are four guide fins 21. The fins 21 are preferably spaced from the valve disk 22 and are each semi-circular in shape. The guide fins 21 serve the dual purposes of acting as a guide to assure that the valve 22 will seat properly and as retarding members to prevent the pendulum 17 from dispensing the fluid or granular material before the proper amount of the material has been measured. The operation of the guide fins 21 will be explained more fully hereinafter.

Attached to the lower end of the shank 20 of the pendulum 17 is a somewhat flexible valve disk 22. The valve disk 22 seats against the sealing surface or valve shoulder 23 of the pouring spout 12 and prevents additional liquid from being discharged from the container after the proper amount of the container's contents has been measured. This will be more fully explained in the operation of the device.

The pendulum 17 may be molded as a one piece unit from any suitable material such as a synthetic resin. Examples of suitable resins would be a polyethylene, butadienes or a polyvinyl chloride. Properly selected ones of these resins will give the molded product enough body and strength for proper operation and the disk 22 sufficient flexibility. The pendulum might also be fabricated of metal, except for the disk member 22 which would be fabricated of rubber. The use of any of these materials will allow the pendulum 17 to be inserted in the pouring spout of a container as it appears on the store shelf. It is important that the disk 22 have sufficient flexibility to permit the disk to be squeezed through the pouring spout 12. By the same token, the pendulum 17 could be removed from the pouring spout of the container when the contents thereof is emptied and the pendulum 17 reused in a full container.

To adapt this novel measuring and dispensing device to a standard spout, the only modification necessary in the pouring spout is that of a shoulder such as the shoulder 16 shown in FIG. 1, to provide a support means for the closure head 18. Such a shoulder could be provided by molding the spout with a shoulder as shown in FIG. 1. Another method of providing a shoulder would be to groove the spout 16 and insert a resilient ring, part of which would snap into the groove and part of which would project into the neck opening as a seat for the closure head 18. It can readily be seen that pouring spouts presently used on containers of this type, by minor modification, can be adapted to use the measuring and dispensing member 17.

It is to be understood that the pendulum 17 can be inserted into the pouring spout of the container at the point of manufacture or by the user in the home. It is so designed that its presence in the spout during shipment does not interfere with a proper seal being effected by the cap 11. Sinch the pendulum 17 is so inexpensive to manufacture, it can be discarded with the container without appreciable monetary loss to either the manufacturer or the consumer or can be removed from the container and reused.

Having explained the structure of the device, the operation thereof will now be explained. The pendulum 17 assumes the position of FIG. 1 when the container in which it is disposed is in the upright position. The shape and weight of the pendulum automatically causes the closure head 18 to engage the seat 16. To measure and dispense a liquid from the container, the cap 11 is removed in the usual manner and the user proceeds to rotate the container into a position so that the contents thereof will pour from the container. As the container is rotated, the member 17 acts as a pendulum and pivots about the shoulder 16 of the pouring spout 12. The pendulum member 17 then assumes the position of FIG. 2. In this position the contents of the container is moving into the neck of the pouring spout between the ring 16 and the seating surface 23. However, the contents of the can cannot escape since the closure head 18 is seated against the shoulder 16 and the walls of the pouring spout 12 above the ring 16.

Figure 2:
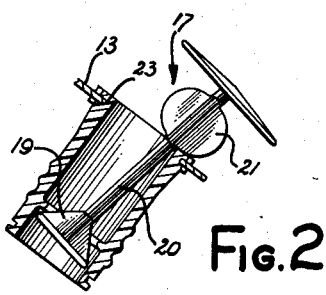
FIG. 2 is a side elevational view of the measuring and dispensing device of FIG. 1 as it would appear in a container that is rotated from its upright position but not into its pouring position.
Figure 3:
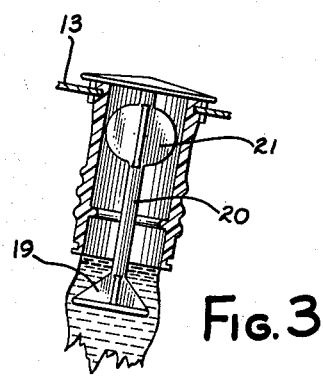
FIG. 3 is a side elevational view of the measuring and dispensing device of FIG. 1 as it would appear in a container when the container is rotated into the pouring position.

FIG. 2 also shows the position that the guide fins 21 assume with respect to the pouring spout 12 when the container is only partially tipped (FIG. 2). It can now be understood how the guide fins 21 act as retarding members. As long as the container 13 is in this partially tipped position, the guide fins 21 extend over the edge of the pouring spout 12 and seat against the sealing face 23. They, thus, prevent the pendulum 17 from moving down into the spout 12. As the container 13 is fully rotated into inverted position, as shown in FIG. 3, the guide fins 21, being semi-circular, slip from the edge of the sealing face and can no longer retard the outward and downward movement of the pendulum member 17. It then assumes the position of FIG. 3. The dislodging of the fins 21 from the sealing surface 23 occurs before the container reaches an inverted position. The weight of the container's contents pressing against the back side of the head 18 is an important factor in accomplishing this. As the contents of the container decreases through use, this factor is less effective. However, the flow of the contents into the spout with the container tipped at a steep angle tends to replace this force. Further, many materials such as detergents, liquid soaps, cooking oils, etc. act as lubricants, facilitating the slippage of the fins over the edge of the sealing face 23.

As the pendulum member 17 slides into the position shown in FIG. 3, the guide fins 21 perform their guiding function, centering the pendulum in the spout. This assures proper seating of the disk valve 22 against the sealing surface or valve shoulder 23. The guide fins 21 are dimensioned so that they are just contained within the pouring spout 12 of the container. Thus it can be seen that the guide fins 21 will of necessity position the disk valve 22 with respect to the sealing surface 23 of the pouring spout 12.

Upon the container being returned to its upright position, the pendulum 17 will fall downward into the container. The guide webs 19 will act with the top inside edge of the pouring spout 12 and assure that the closure head 18 is properly centered and seated on the shoulder or ring 16.

The above sequence of events will take place provided the container is inverted from the upright position to the pouring position at a rate which would be normal for such a procedure. During the time that the container is being inverted the contents of the can will flow into the pouring spout 12 and the amount of the contents to be dispensed will depend upon the length and the diameter of the spout. Normally about one cap full of the contents is necessary, for example, to wash the dishes. Therefore, the length and diameter of the spout in this instance would be proportioned so that approximately one cap full of the contents would flow into the spout 12 before the pendulum 17 slides outwardly into discharge and container sealing position (FIG. 3).

If the container 13 is rotated from the upright position to a position somewhat similar to that shown (FIG. 2) and retained in this position, a different result is obtained. As can be seen in FIG. 2, the closure head 18 in this position is partially unseated from the sealing shoulder 16. If the container is maintained in this position, the measuring and dispensing member 17 is short circuited. In other words, the contents of the can is no longer measured and then discharged but is allowed to flow relatively freely from the container in amounts as desired. The flow of the contents of the can can be quickly stopped by further inversion of the container (FIG. 3) to the position where the valve disk 22 will quickly seat against the sealing surface 23 or by returning the container to the upright position.

Figure 4:
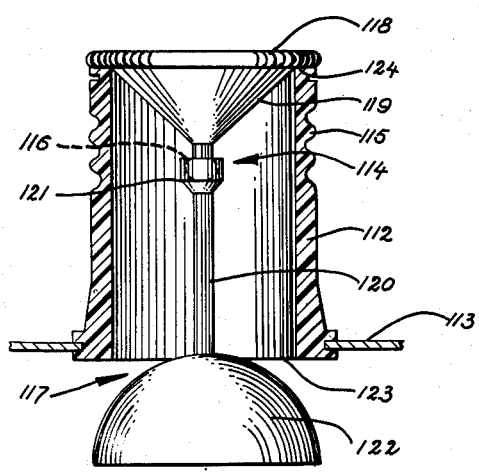
FIG. 4 is a side elevational view of a modified form of the measuring and dispensing device as it would normally appear in a container that is in the upright position.
Figure 5:
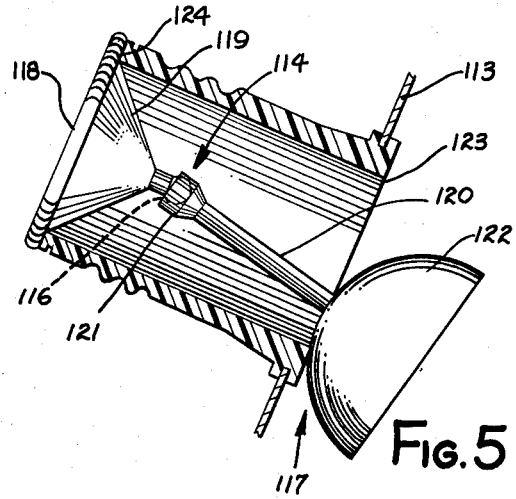
FIG. 5 is a side elevational view of the measuring and dispensing device of FIG. 4 as it would appear when the container is rotated from its upright position and before it assumes the pouring position.

A modified form of the invention is shown in FIGS. 4 and 5. Although the principle of operation of the modified form of pendulum, designated generally as 117, is quite similar to that of pendulum 17, they are structurally quite different.

FIG. 4 shows a container 113 and a pouring spout 112 attached thereto in the usual manner. The pouring spout 112 has threads 115 which are adapted to engage the threads of a conventional cap (not shown).

Disposed within the container 113 and the container spout 112 is a pendulum-like dispensing and measuring member 117. The pendulum 117 has a closure head 118. The closure head has a generally conical guide web 119. The guide web 119 is connected to the shank 120 of the pendulum 117 by a universal joint generally 114. The universal joint consists of a ball on the apex of the head 118 and a socket 121 which is formed integral with the shank 120. Thus, the shank 120 depends or swings from the closure head 118. At the bottom end of the shank 120 is a valve member 122. The valve member 122 is generally hemispherical in shape. Preferably, it is a little more than a half of a sphere. The valve member 122 serves several purposes. It acts as a retarding means, a guide means, and a valve. The function of the member 122 will be explained more fully hereinafter. The pouring spout 112 has an end surface 124 which acts as a seat for the closure head 118. The closure head 118 rests on the seat 124 and supports the remainder of the pendulum 117.

The universal joint 114 is so constructed and arranged that the ball 116 may be inserted in the socket 121 to facilitate assembly. Thus the ball and socket 114 are composed of material having yielding properties that will allow such assembly.

This modified form of the measuring and dispensing device can be used with pouring spouts presently on the market and no modifications need be made to the pouring spout. This is particularly advantageous because a dispenser 117 of given size can be used with most any container possessing a pouring spout of comparable size by merely disposing the shank and valve of the pendulum 117 within the spout and container.

The pendulum member 117 can be constructed entirely of plastic or of metal, except for the valve member 122 which could be made of rubber or plastic. It is necessary that the valve member 122 be flexible so that it can be forced down through the pouring spout 112 and assume its expanded position in the container 113. The pendulum 117 can be positioned within the pouring spout and container by either the manufacturer or the user as was the case with the pendulum 17.

The operation of this device is also based upon the principle that the member 117 acts as a pendulum. When the container 113 is rotated from the upright position, the valve 122 and the shank 120 will rotate about the universal joint 114 and assume the position shown (FIG. 5).

The valve 122 is so designed that it operates as a retarding means and guide means as well as a valve. The valve 122 abuts against the valve seat or valve shoulder 123 and prevents the contents of the can, flowing into the pouring spout 112, from forcing the closure head 118 from its seat 124 and thereby retards movement of the pendulum 117. The partially tipped position (FIG. 5) is maintained until the can is rotated into the pouring position. When the can assumes the pouring position, the valve 122, because of its hemispherical shape, will guide itself into proper position against the valve seat 123. The valve 122 is of larger diameter than the opening through the seat 123. Thus it prevents further discharge from the container. The entire pendulum 117 moves downwardly toward the pouring spout 112 as the valve 122 assumes its position against the valve seat 123. Since the entire pendulum 117 has moved downwardly, the valve closure head 118 is displaced from its seat 124 and the material contained within the pouring spout 112 is dispensed.

The quantity of liquid dispensed is dependent upon the diameter and length of the pouring spout 112 as previously described with respect to the device of FIG. 1.

On the container being returned to its upright position, the pendulum 117 will slide downwardly toward the container. The guide web 119 co-acts with the top inside edge of the pouring spout 112 and assures proper centering and seating of the closure head 118 on the pouring spout 112. Therefore, it can be seen in a pouring cycle that the pendulum 117 reciprocates from a closure head seating position to a valve seating position, to the original closure head seating position.

Figure 6:
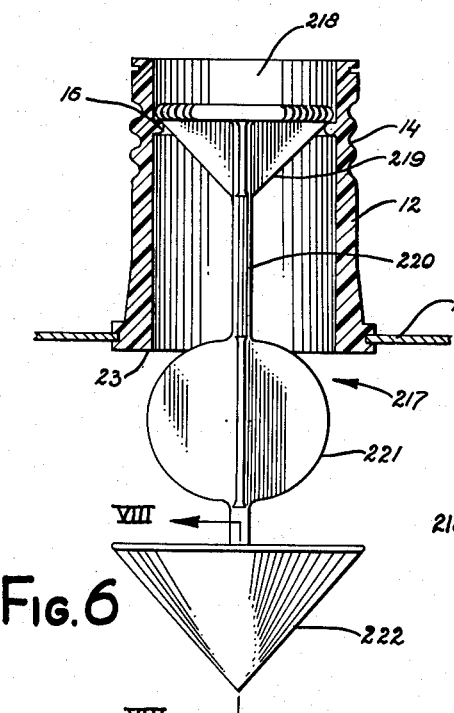
FIG. 6 is a view of still another modification of the measuring and dispensing device as it would appear in a container that is in an upright position.
Figure 7:
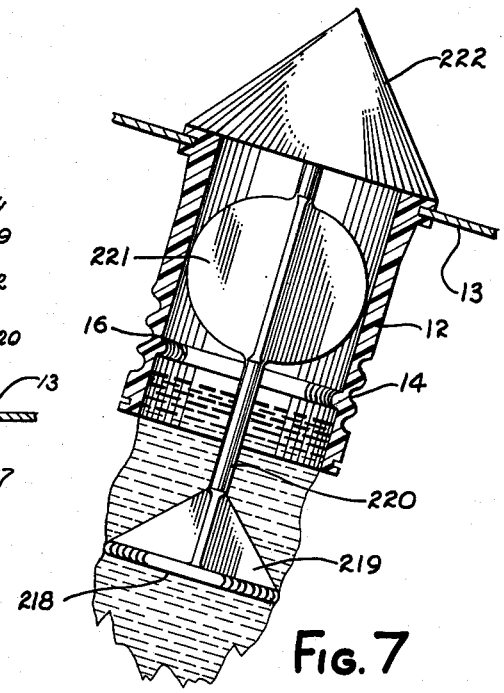
FIG. 7 is a side elevational view of the measuring and dispensing device of FIG. 6 as it would appear in the container when the container is in the pouring position.

FIGS. 6 and 7 show still another modification of the dispensing and measuring device. The pendulum 217 of FIG. 6 is identical to that of the pendulum 17 in FIG. 1, except for the valve head 222. It utilizes the same spout construction as shown and described in connection with FIG. 1.

The pendulum, designated generally as 217, has a closure head 218. Secured to the closure 218 is a shank member 220. Attached to the shank 220 and the closure head 218, and spaced at 90° intervals about the shank 220, are four guide webs 219. Disposed adjacent the bottom end of the shank 220, and spaced at 90° intervals thereabout, are secured four fin guide members 221. Secured to the end of the shank 220 opposite the closure head is a valve head member 222. The valve head 222 is flexible and of conical shape. The valve head 222 is hollow or of a shell design to conserve material and flexibility. However, it may be of a solid design if so desired and a compressible material is selected for its manufacture.

As in the pendulums 17 and 117, the pendulum 217 can be a one piece mold of plastic or constructed of metal, except for the valve head 222 which would be made of a flexible material such as rubber.

The pendulum 217 can also be assembled in the container by either the manufacturer or the user.

The operation of the pendulum 217 is identical to that of the pendulum 17 except for the valve head 222. Therefore, only the operation of the valve head 222 will be explained in detail.

As shown (FIG. 6) the valve head 222 is of a conical shape. When the container 13 is inverted into the pouring position (FIG. 7), the pendulum 217 will assume the position as shown in FIG. 7. However, prior to the pendulum 217 assuming the discharge position (FIG. 7), it assumes a filling position (FIG. 5) similar to that of the pendulum 17 (FIG. 2). As the container is inverted into the pouring position, the contents of the container rushes toward the pouring spout, since the container is being placed in the upside down position. As the contents of the container rushes into the pouring spout, it reacts upon the valve head 222. The valve head 222 is constructed of a conical shape to take advantage of the rushing contents of the container. Because of the size of the conical valve head 222, the contents of the container react against a greater surface area and, therefore, seats the valve head 222 against the sealing surface 23 of the pouring spout 12 with greater force. In other words, the seating properties of the valve head 222 on the sealing surface 23 of the pouring spout 12 are better than that of the pendulum 17 or 117 because of the size of the valve head 222.

Figure 8:
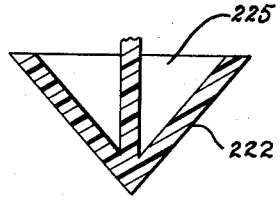
FIG. 8 is a cross sectional view taken along the plane VIII—VIII of FIG. 6.

However, a hollow conical head, when the container is upright, provides a catch basin 225 (FIG. 8) for liquid dripping back into the container from the pouring spout. This liquid adds to the weight of the pendulum, pulling the head 218 into tighter sealing engagement with the seat 16.

Figure 9:
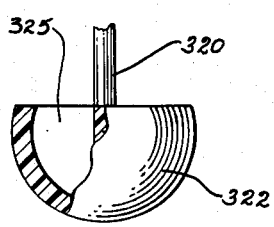
FIG. 9 is a side elevational view of a modified form of the valve head having a portion thereof cut away.

FIG. 9 shows another modification of a valve head structure designated as 322. The valve head 322 is of a hemispherical shape and is designed as a substitute for the conical sealing valve 222. The valve head 322, because of its shape, has the same operational advantage as the valve head 222 of the pendulum 217. This advantage being that the hemispherical shape of the valve 322 offers a large surface area against which the contents of the container react in its rush to the pouring spout of the container. Therefore, the seating properties of the valve 322 will be greater because the contents of the container will apply a greater force thereto as it is seated against a sealing surface such as 23 of the device shown in FIG. 6. It also provides an internal catch basin 325 (FIG. 9) which acts in exactly the same manner as the catch basin 225 of the valve 222.

As shown in FIG. 9, the hemispherical valve 322 is of a hollow or shell design and the pendulum shank 320 is secured to the dome thereof. The shell-like design of the valve 322 conserves material, reducing its cost of manufacture and increasing its flexibility. However, it is to be understood that the valve 322 may be molded as a solid piece if so desired.

It will be recognized that the guide fins and webs described as being adjacent both ends of the pendulum may be arranged in any suitable pattern. The disclosure of a 90° spacing is merely illustrative and other spacings may be used satisfactorily without departure from this invention.

The fact that each one of the pendulum designs shown herein provides a valve head which closes the open end of the spout is important. This prevents air from entering the container even though the cap is not replaced. Many materials such as liquid detergents become highly viscous and gummy when exposed to air for any appreciable length of time. The sealing effect of the valve head prevents this. Furthermore, it closes the pouring spout automatically. Therefore, accidental failure to close the container is eliminated.

This invention provides an inexpensive valve and measuring device for many pourable products. It is so inexpensive that it can be discarded with the container. It is adaptable to existing pouring spouts with minor modification of the pouring spouts. It is a multi-purpose device. It effectively seals the container when upright. It permits steady pouring when the container is partially inverted. It acts as an automatic measuring device and flow shut-off valve when the container is inverted rapidly.

While a preferred embodiment of this invention has been described together with several modifications thereof, it will be understood that other modifications and improvements thereof may be made. Such of these modifications and improvements as incorporate the principles of this invention are to be considered as included in the hereinafter appended claims unless these claims by their language expressly state otherwise.

I claim:

1. A dispensing device adapted to be disposed in the spout of a container comprising: a generally flat closure head; a shank secured to said closure head and extending transversely therefrom; web guide means secured to said closure head and shank; a valve secured to the end of the shank opposite said closure head; fin guide means integral with and projecting radially from said shank and disposed above said valve; said shank having a central finless portion to allow said shank to pivot about said fin guide means into a position in which both ends of said spout are open and liquid can freely flow past said fin guide means; said web guide means and fin guide means adapted to cooperate with the container spout so that said closure head is guided by said web means into a position to seal the discharge end of the spout and said valve is guided by said fin means into a position to seal the inlet end of the spout.

2. In combination with a container having a pouring spout arranged to receive a cap thereover, said spout defining a generally cylindrical fluid passage and having inner and outer valve seat surfaces at its inner and outer ends, respectively, extending radially of said passage: a dispensing and measuring device comprising a closure head adapted to normally rest on said outer valve seat surface and a disc valve, said closure head and disc valve being connected by a shank; and fins extending axially of and radially from said shank in a position normally clear of said passage so that said fins fall into engagement with said inner valve seat surface when said spout is tilted horizontally, and slide into said passage to guide said disc valve into engagement with said inner valve seat surface when said spout is turned upside down; said fins also serving as pivots in said neck to allow said device to assume a position in which both ends of said spout are open, and in which liquid can freely flow through said spout past said fins to selectively eliminate the measuring function of said device when desired.

References Cited in the file of this patent

UNITED STATES PATENTS

| | | |
|---|---|---|
| 564,209 | Meins | July 21, 1896 |
| 645,706 | Grant | Mar. 20, 1900 |
| 1,038,465 | Warner et al. | Sept. 12, 1912 |
| 2,017,839 | Berendt | Oct. 22, 1935 |
| 2,581,897 | Allen | Jan. 8, 1952 |
| 2,684,790 | Porter | July 27, 1954 |

FOREIGN PATENTS

| | | |
|---|---|---|
| 340,386 | Italy | Mar. 13, 1936 |
| 779,586 | France | Apr. 9, 1935 |